United States Patent Office 3,660,567
Patented May 2, 1972

3,660,567
LATERIOMYCIN F
Eiji Higashide, Takarazuka, Toru Hasegawa, Osaka, Motoo Shibata, Toyonaka, Toyokazu Kishi, Nara, Setsuo Harada, Suita, and Komei Mizuno, Osaka-fu, Japan, assignors to Takeda Chemical Industries, Ltd., Osaka, Japan
Filed Apr. 3, 1967, Ser. No. 627,772
Claims priority, application Japan, Apr. 2, 1966, 41/20,858; Apr. 20, 1966, 41/25,406
Int. Cl. A61k 21/00
U.S. Cl. 424—122         1 Claim

ABSTRACT OF THE DISCLOSURE

Lateriomycin F, produced by incubating a Lateriomycin F-producing strain of *Streptomyces griseoruber* in a culture medium at a temperature of about 25° C. to 35° C. under aerobic conditions until Lateriomycin F is accumulated in the culture broth and recovering thus accumulated Lateriomycin F therefrom, is useful as a disinfectant, in the treatment of Staphylococcus infections, and as an antibiotic in the treatment of experimental tumors.

---

Figure 1:
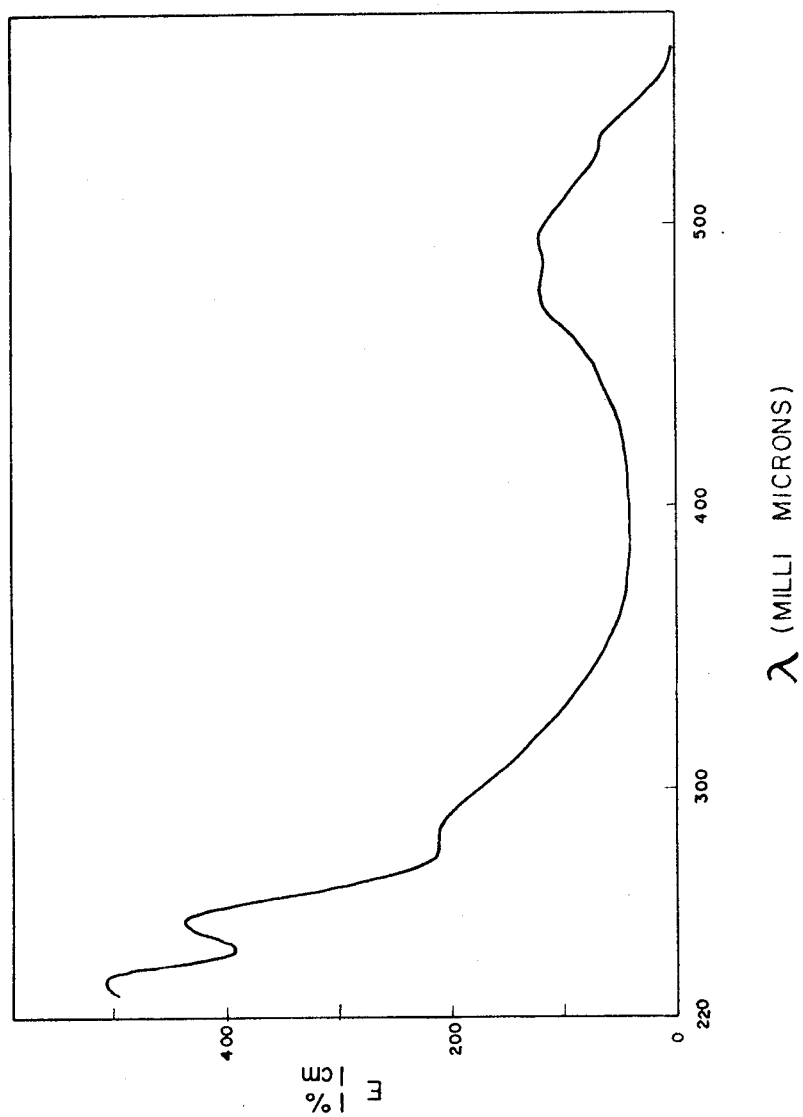

This invention relates to Lateriomycin F and to its microbial production.

The invention is based on the following findings:

(1) *Streptomyces griseoruber* No. 71070, a strain isolated from a sample of soil collected in Aqua Blanca, Mexico, is capable of producing a new antibiotic;
(2) the antibiotic is accumulated when the microorganism is incuabted in a nutrient medium;
(3) the so-accumulated antibiotic can be recovered in a desired purity from the culture broth, utilizing the physicochemical properties of the antibiotic; and
(4) the antibiotic has strong antimicrobial activity against Gram-positive bacteria.

The new antibiotic has been named "Lateriomycin F."

In the method of the present invention, microorganisms which belong to *Streptomyces griseoruber* and can produce Lateriomycin F are employed. These microorganisms include, for example, (a) *Streptomyces griseoruber* No. 71070 mentioned above, and (b) mutants and variants thereof.

The morphological and cultural characteirstics of *Streptomyces griseoruber* No. 71070 are as follows. In the following characteristics, the color names designated by the attachment of the color names following "Rdg" are based on "Ridgway's Color Standards and Nomenclature."

(a) Morphological characteristics:
The aerial mycelium develops well on glucose asparagine agar and its color is white at first and then changes to Pale Vinaceous Pink or Pale Mouse Gray. The sporophore forms loops or spirals and the spore is ellipsoidal or oval, 0.50.8µ×1.0–1.3µ and smooth on the surface.

(b) Cultural characteristics:
Czapek's agar
Vegetative mycleium (referred to as VM, hereinafter); Abundant, wrinkled, colorless, later Congo Pink (Rdg. XXVIII, 7″-b).
Aerial mycelium (referred to as AM, hereinafter); Velvety, chalk white, later Pallid Mouse Gray (Rdg. LI, 15′′′′′-f).
Soluble pigment (referred to as SP, hereinafter); Light Pinkish Cinnamon (Rdg. XXIX, 15′-d).
Glycerin Czapek's agar
VM: Moderate, Pale Vinaceous-Drab (Rdg. XLV, 5′′′′-d) to Dark Vinaceous-Drab (Rdg. XLV, 5′′′′′-i).
AM: Thin, Pallid Purple-Drab (Rdg. XLV, 1′′′′-f) to Pale Quaker Drab )Rdg. LI, 1′′′′′-d).
SP: Faint brown.
Glucose Czapek's agar
VM: Abundant, wrinkled, Light Vinaceous-Cinnamon (Rdg. XXIX, 13″-d) to Fawn Color (Rdg. XL, 13′′′).
AM: Thin, Palid Vinaceous-Drab (Rdg. XLV, 5′′′′-f).
SP: Faint brown or none.
Glucose asparagine agar
VM: Abundant, Buff-Pink (Rdg. XXVIII, 11″-d) Pale Congo Pink (Rdg. XXVIII, 7″-f).
AM: Velvety, Pale Vinaceous-Pink (Rdg. XXVIII, 9″-f) to Pale Mouse Gray (Rdg. LI, 15′′′′′-d).
SP: Salmon-Buff (Rdg. XIV, 11′-d).
Nutrient agar
VM: Moderate, colorless, later dark brown.
AM: Poor, powdery, white to Pale Mouse Gray.
SP: Dark brown.
Nutrient broth
VM: Moderate, faint brown film without sediment.
AM: White to Pallid Mouse Gray.
SP: Blackish brown.
Glucose nutrient broth
Almost same as on nutrient broth, but growth is more abuandant and lichenoid.
Glucose nutrient agar
VM: Abundant, wrinkled, dark brown.
AM: Thin, chalk white to Pallid Quaker Drab (Rdg. (Rdg. LI, 1′′′′′-f).
SP: Dark brown.
Glycerin nutrient agar
VM: Abundant, wrinkled, dark brown.
AM: Poor, chalk white.
SP: Dark brown.
Glycerin nutrient broth
Almost same as on glucose nutrient broth.
Starch agar
VM: Abundant, Pallid Vinaceous Drab (Rdg. XLV, 5′′′′-f) to Vinaceous-Lavender (Rdg. XLIV, 65′′′-f).
AM: Abundant, velvety, white to Vinaceous-Lavender.
SP: Pale Persian Lilac (Rdg. XXXVIII, 69″-f) or none.
Egg medium (37° C.)
VM: Abundant, spreading, brownish black.
AM: Poor, white to Pale Quaker Drab.
SP: Color of medium become milky white.
Yeast extract agar
VM: Abundant, wrinkled, Buff-Pink (Rdg. XXVIII, 11″-d) to brown.
AM: Abundant, velvety, chalk white to Pallid Mouse Gray.
SP: Army Brown (Rdg. XL, 13′′′-i).
Potato plug
VM: Abundant, wrinkled, Pale Purple-Drab (Rdg. XLV, 1′′′′-d) to Pale Quaker Drab.
AM: Poor, Mouse Gray.
SP: Dark brown.
Milk (37° C.)
Cream colored ring formed, weak peptonization without coagulation.
Nutrient gelatin (25° C.)
VM: Poor, lichenoid, dark brown.
AM: Poor, white to Mouse Gray. Liquefaction slow.
Nitrate reduction in Czapek's solution
No reduction.

Cellulose
  No growth.
Hydrolysis on starch agar
  Hydrolysis, growth zone/enzymatic zone-11-13 mm./15-17 mm.
Peptone agar
  VM: Thin, spreading, dark brown.
  AM: Abundant, velvety, white to Mouse Gray.
  SP: Dark brown.
Calcium malate agar
  VM: Abundant, Pale Salmon Color (Rdg. XIV, 9'-f) to Flesh Color (Rdg. XIV, 7'-d).
  AM: Abundant, velvety, white to Mouse Gray.
  SP: None or Light Pinkish Cinnamon (Rdg. XXIX, 15''-d).
Carrot plug
  VM: Abundant, wrinkled.
  AM: Poor, white to Orient Pink (Rdg. II, 9-f) to Light Mouse Gray.
  SP: Faint brown.
Tyrosine agar
  VM: Thin, colorless to Ivory Yellow (Rdg. XXX, 21''-f).
  AM: None.
  SP: None.

On synthetic media the vegetative mycelium of this strain develops well and it is colorless at first, but changes to pale orange or pale pink, and a pale yellowish brown or pale pink soluble pigment is produced. On a medium containing protein the color of vegetative mycelium is pale brown or dark brown, while white or Pallid Mouse Gray aerial mycelia are formed. The soluble pigment is brown or blackish brown. From the above-mentioned characteristics, this strain is found to be of the chromogenic type.

(c) Carbon source utilization observed by Pridham's method:

| Carbon source | Growth | Carbon source | Growth |
|---|---|---|---|
| Erythritol | − | D-Maltose | +++ |
| D-Sorbitol | + | Sucrose | +++ |
| i-Inositol | +++ | Lactose | +++ |
| D-Mannitol | +++ | Raffinose | +++ |
| Dulcitol | ± | Trehalose | +++ |
| D-Ribose | ++ | Salicin | − |
| D-Xylose | +++ | Inulin | +++ |
| L-Arabinose | +++ | Cellobiose | +++ |
| D-Galactose | +++ | Glycerin | +++ |
| D-Glucose | +++ | Na-acetate | + |
| D-Fructose | +++ | Na-succinate | ++ |
| L-Rhamnose | +++ | Na-citrate | + |
|  |  | Control | − |

NOTE.—+++ Very good growth; ++ Good growth; + Fair growth; ± Faint growth; − No growth.

Comparison of the above-mentioned microbial properties with the description in "The Actinomycetes, Volume II" written by S. A. Waksman, published by The Williams and Wilkins Company in 1961, shows that the strain usable in the present invention is similar in cultural characteristics to *Streptomyces fervens* De Boer et al., *Streptomyces purpurascens* Lindenbein and *Streptomyces griseoruber* Yamaguchi & Saburi. However, there are some differences in the morphological characteristics of the strain from those of *Streptomyces fervens* De Boer et al. and *Streptomyces purpurascens* Lindenbein. More specifically, *Streptomyces fervens* De Boer et al. forms monoverticillate or biverticillate branching, and the spore of *Streptomyces purpurascens* Lindenbein is spinous on the surface. In contrast, the present strain does not form such branching and its spore is smooth on the surface. On the other hand, *Streptomyces griseoruber* Yamaguchi & Saburi appears to coincide with the present strain in morphological characteristics. Hence, the present strain is classified as belonging to *Streptomyces griseoruber*, and named *Streptomyces griseoruber* No. 71070.

A specimen of *Streptomyces griseoruber* No. 71070 was deposited at American Type Culture Collection, Maryland, U.S.A., under the accession number ATCC 17919.

The antibacterial spectrum observed by the cross-streak method of *Streptomyces griseoruber* No. 71070 on bouillon agar and glycerin bouillon agar is shown in Table 1. *Streptomyces griseoruber* No. 71070 was streaked on agar plates and incubated at 28° C. for four days. The plates were then cross-streaked with test organisms shown in Table 1 and were further incubated at 37° C. for twenty hours for Gram-positive and Gram-negative bacteria, or for forty hours for acid-fast bacteria. Finally the inhibition length for each test organism was measured.

TABLE 1

[Antibacterial spectrum of *Streptomyces griseoruber* No. 71070 by cross streak method]

|  | Inhibitory zone (mm.) | |
|---|---|---|
|  | Bouillon agar | Glycerin bouillon agar |
| *Escherichia coli* | 3  3 | 2  2 |
| *Proteus vulgaris* | 0  0 | 7  6 |
| *Staphylococcus aureus* | 13  13 | 6  7 |
| *Bacillus subtilis* | 14  15 | 8  8 |
| *Bacillus cereus* | 11  11 | 0  0 |
| *Bacillus brevis* | 13  13 | 0  0 |
| *Sarcina lutea* | 17  18 | 7  6 |
| *Micrococcus flavus* | 14  15 | 7  7 |
| *Aerobacter aerogenes* | 0  0 | 0  0 |
| *Pseudomonas aeruginosa* | 0  0 | 3  3 |
| *Mycobacterium avium* |  | 0  0 |
| *Mycobacterium smegmatis* |  | 0 |
| *Mycobacterium phlei* | 0 | 0 |

Table 1 shows that *Streptomyces griseoruber* No. 71070 produces antibiotic substance mainly active against Gram-positive bacteria.

The microbial characteristics of actinomycetes, especially the genus Streptomyces, are not generally fixed and this applies also to the characteristics of *Streptomyces griseoruber* No. 71070. Therefore, there may be many natural or induced mutants and variants of *Streptomyces griseoruber* No. 71070.

Among the mutants and variants of *Streptomyces griseoruber* No. 71070, regardless of whether the variation may be caused spontaneously or inducedly, for example, with X-ray, ultraviolet-ray or by the action of chemical reagents, in per se known manner, any one capable of producing Lateriomycin F may be employed in the method of the present invention.

In the method of the present invention, a Lateriomycin F-producing strain of *Streptomyces griseoruber* is incubated on a culture medium containing assimilable carbon sources, digestible nitrogen sources and other necessary nutrients. As carbon sources, for example, starch, glucose, lactose, maltose, galactose, sucrose, dextrin, glycerol or millet jelly may be employed.

As nitrogen sources, for example, peptone, soybean flour, cornsteep liquor, meat extract, ammonium salts, nitrates, or other organic or inorganic nitrogen-containing materials may be employed. Further, a small quantity of inorganic salts such as sodium chloride, phosphates, salts of metals such as calcium, zinc, manganese, iron may be added to the medium. And, if necessary, conventional nutrient factors or an antifoaming agent such as animal oil or wax, vegetable oil or mineral oil may be added.

Especially desirably, the culture medium may contain an iron salt of inorganic acid such as ferrous salt (e.g. ferrous sulfate, ferrous chloride) and ferric salt (e.g. ferric sulfate, ferric chloride) in a relatively high concentration, because a considerably enhanced amount of Lateriomycin F is accumulated in the culture broth by incubating the Lateriomycin F-producing strain of *Streptomyces griseoruber* in such a medium, as clearly shown in the following experiments and examples, as compared with the incubation in a conventional culture medium, i.e. one not containing such iron salt or containing less than 0.001% (weight/volume) thereof. The optimum concentration of the iron salt to be contained in the culture medium is about 0.03% to about 0.1% (weight/volume) from the viewpoint of the yield of the objective Lateriomycin F to be accumulated in the culture broth.

Most desirably, the culture medium may contain about 0.001% to about 0.05% (weight/volume) of calicum chloride, zinc chloride or cupric sulfate as well as the said inorganic iron salt, because a large amount of Lateriomycin F is accumulated in the culture broth when Lateriomycin F-producing strains of *Streptomyces griseoruber* are incubated in such medium, as clearly shown in the Experiment 2, as compared with the incubation in a culture medium containing only the said iron salt.

For the incubation of a Lateriomycin F-producing strain, submerged culture utilizing liquid medium is preferable. But, as occasion demands, shaking culture may be conducted for the purpose. And, cultural conditions such as temperature, culture period and pH of the medium can be determined so as to obtain Lateriomycin F in a yield as good as possible. When a submerged culture is employed, the production of Lateriomycin F becomes maximum generally under such conditions as at a temperature of about 25° C. to 35° C., at around neutral pH and with a culture period of about 2 to 6 days.

Lateriomycin F thus produced is contained mostly in the mycelia, but also in the clear broth of the culture broth. Lateriomycin F thus accumulated in the culture broth is recovered and refined to a desired purity by utilizing physico-chemical properties of Lateriomycin F, for example, differences between Lateriomycin F and impurities in solubility, in distribution coefficient between two liquid phases, in adsorbability or in ion-coherence. Most practically, Lateromycin F accumulated in the culture broth is recovered by utilizing difference between Lateriomycin F and impurities in solubility in organic solvents. For example, the following means give superior results in the recovery of Lateriomycin F. The mycelia separated from the culture broth of Lateriomycin F-producing strain is extracted with methanol, acetone, or mixture of acetone and ethyl acetate, and the extract is concentrated in vacuo to evaporate organic solvents. The concentrates and/or the clear broth are optimally extracted with chloroform, acetic acid esters or methyl ethyl ketone. The resultant extract is concentrated in vacuo to a certain volume, and then petroleum ether is added thereto to give precipitates. The precipitates are collected by decantation and washed with diethyl ether to give crude Lateriomycin F. The crude product is dissolved in acetone or ethyl acetate, and then reprecipitated with diethyl ether to give purified Lateriomycin F.

The amount of respective solvents to be employed in the above-mentioned purifying process can be chosen so as to obtain the purified Lateriomycin F in a yield as good as possible.

The physico-chemical properties of Lateriomycin F thus purified are as follows:

(1) Elementary analysis:

| C%    | H%          | N%          |
|-------|-------------|-------------|
| 63.04 | 6.35        | 1.98        |
| 61.85 | 6.30        | 2.15        |
| 62.98 | 6.18        | 1.83        |
| 63.59 | 6.44        | 2.12        |
| 61.96 | 6.45        | 1.39        |
| 62.68±1.25 | 6.34±0.50 | 1.89±0.60 |

(2) Specific rotation: $[\alpha]_D^{23} = +110 \pm 20°$ (c.=0.1, 1% DMF (dimethylformamide) in 99% EtOH)

(3) Absorption spectrum: The ultraviolet and visible absorption spectrum of Lateriomycin F in 0.5% acetic acid in ethanol is as shown on FIG. 1 of the accompanying drawing. The significant maximum absorption observed are as follows:

$\lambda_{max}^{0.5\% \text{ AcOH in EtOH}}$ 234 $m\mu$ ($E_{1cm.}^{1\%} = 465 \pm 45$)

252 $m\mu$ ($E_{1cm.}^{1\%} = 415 \pm 40$)

285 $m\mu$ ($E_{1cm.}^{1\%} = 190 \pm 20$)

480 $m\mu$ ($E_{1cm.}^{1\%} = 125 \pm 25$)

498 $m\mu$ ($E_{1cm.}^{1\%} = 125 \pm 25$)

533 $m$ Shoulder

Figure 2:
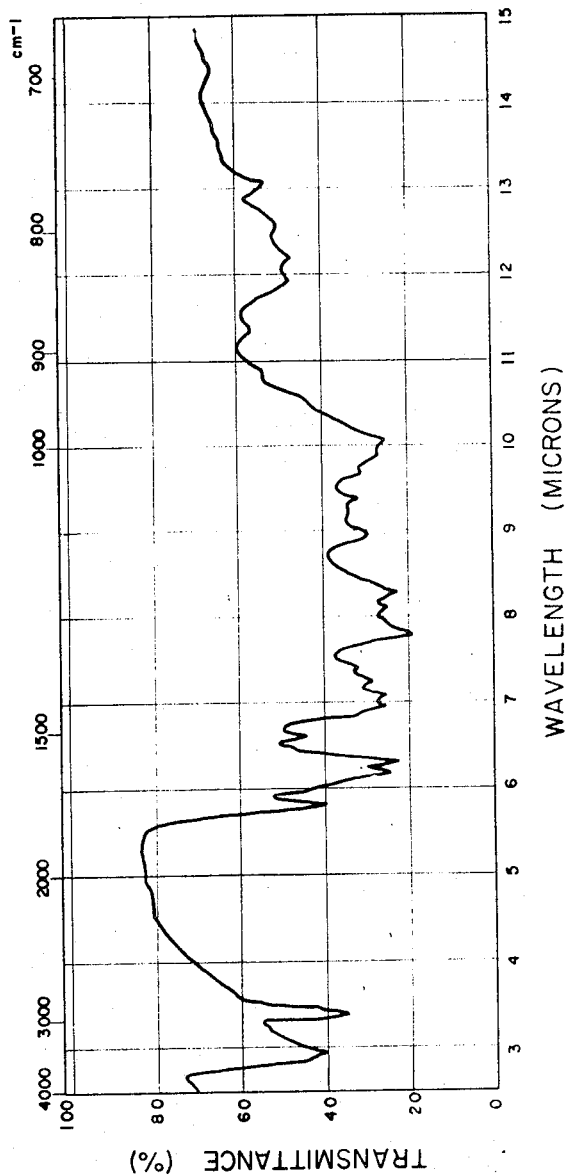

The infrared absorption spectrum of Lateriomycin F measured by the potassium bromide disk method is as shown in FIG. 2 of the accompanying drawing. The significant absorption bands in microns are as follows: 2.90(m.), 3.38(m.), 3.41(m.), 3.50(m.), 5.82(m.), 6.18(v.s.), 6.30(v.s.), 6.60(m.), 6.90(s.), 7.08(s.), 7.28 (s.), 7.40(s.), 7.79(v.s.), 8.10 (v.s.), 8.28(v.s.), 8.92 (s.), 9.23(m.), 9.38(m.), 9.65(s.), 9.90(s.), 10.05(s.), 11.27 (w.), 11.88(m.), 12.20(m.), 12.65(m.), 13.10(w.). Note.—v.s.: very strong; s.: strong; m.: medium; w.: weak.

(4) Color reaction: Lateriomycin F is positive to Molisch reaction and ferric chloride reagent, and shows purple red color in concentrated sulfuric acid.

(5) Solubility: Lateriomycin F is soluble in methanol, ethanol, n-butanol, acetone, chloroform, dichloromethane, ethyl acetate, benzene, toluene, acetic acid, dimethylformamide, 2-methoxyethanol (methyl Cellosolve), hardly soluble in diethyl ether and insoluble in water, petroleum ether, n-hexane and cyclohexane.

(6) Rf value in paper partition chromatography: Paper partition chromatograph measured by ascending method is as follows:

| Solvent systems | Papers | Rf value |
|---|---|---|
| n-Butanol saturated with | Whatman filter paper No. 1* (W. and R. Balston Ltd., Great Britain). | 0.8–0.9 |
| Do | Arches filter paper No. 302*  | 0.8–0.9 |
| Do | Toyo filter paper (Toyo Roshi Kaisha Ltd., Japan). | 0.8–0.9 |
| n-Butanol saturated with phosphate buffer (pH 5.6). | Whatman filter paper No. 1 | 0.65–0.95 |
| n-Butanol, acetic acid water (4:1:5). | do | 0.75–0.95 |
| Acetone: benzene: water (12:3:2). | do | 0.75–0.99 |

(7) Rf value in thin layer chromatography: Rf value on thin layer chromatograph measured by ascending method with the use of ethylacetate-methanol (10:1) on Silica gel G (Merck Ltd., Germany) is 0.2–0.45.

(8) Molecular weight: 1020±220 by vapor pressure osmometer method in ethyl acetate.

(9) Aglycone: Aglycone of Lateriomycin F, obtained from Lateriomycin F by hydrolysis for 40–45 minutes about 80° C. with 1.0 N—$H_2SO_4$, shows the following properties:

(a) Elementary analysis:

|  | Carbon (percent) | Hydrogen (percent) | Oxygen (percent) |
|---|---|---|---|
| Test No.: |  |  |  |
| I | 63.27 | 4.41 | 31.93 |
| II | 63.07 | 4.57 | 32.36 |
|  | 63.31±0.3 | 4.55±0.2 | 32.13±0.3 |

(b) Melting point: 212–217° C.

Figure 3:
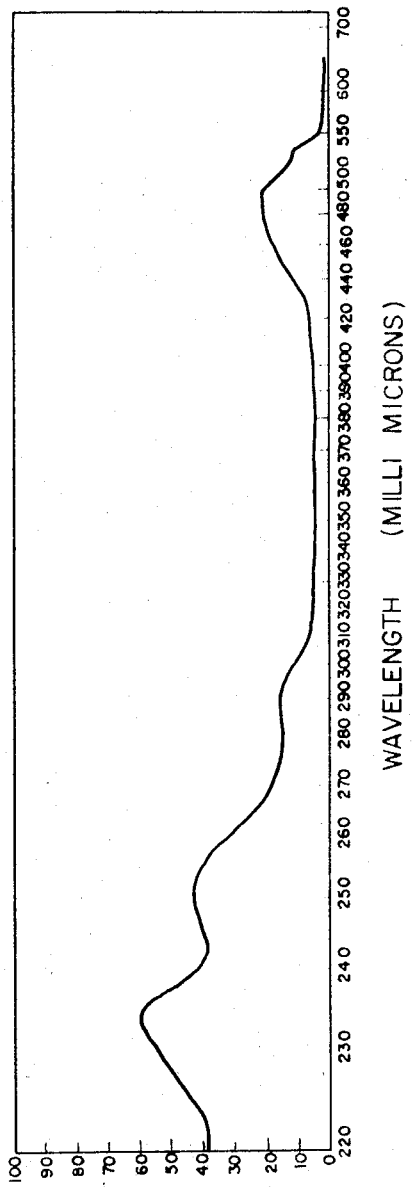

(c) Absorption spectrum: The ultraviolet and visible absorption spectrum of the spectrum of the said aglycone in ethanol is as shown on FIG. 3 of the accompanying drawing. The significant maximum absorption observed are as follows:

$\lambda_{max.}^{EtOH}$ 234 ($E_{1cm.}^{1\%} = 925$)

252 ($E_{1cm.}^{1\%} = 664$)

290 ($E_{1cm.}^{1\%} = 232$)

495 ($E_{1cm.}^{1\%} = 295$)

Figure 4:
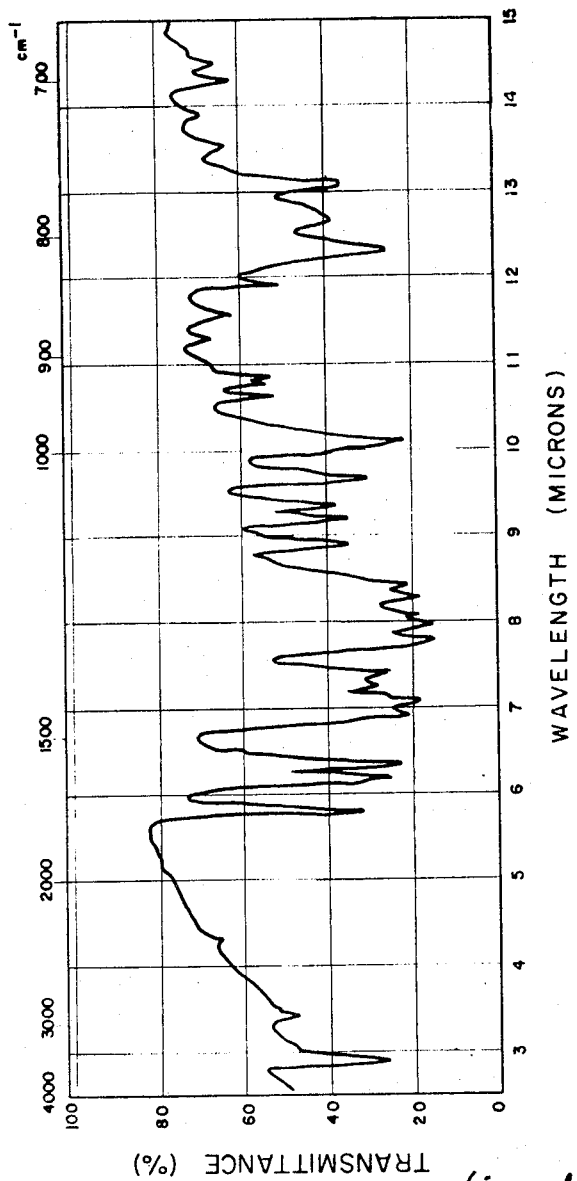

The infrared absorption spectrum of the said aglycone measured by the potassium bromide disk method is as shown in FIG. 4 of the accompanying drawing. The significant absorption bands in microns are as follows: 2.88(m.), 3.42(m.), 5.80(s.), 6.18(v.s.), 6.32(v.s.), 6.92(v.s.), 7.06(v.s.), 7.25(s.), 7.40(v.s.), 7.78(v.s.), 7.97(v.s.), 8.10(v.s.), 8.28(v.s.), 8.42(v.s.), 8.70(m.), 8.88(s.), 9.19(s.), 9.35(s.), 9.65(s.), 10.10(v.s.), 10.60(m.), 10.77(m), 10.85(m), 11.28(w.), 11.57(w.), 11.93(m.), 12.30(v.s.), 12.65(m.), 13.08(s.), 13.52(w.), 13.90(w.), 14.30(w.), 14.50(w.). Note.—v.s.: very strong; s.: strong; m.: medium; w.: weak.

(d) Specific rotation: $[\alpha]_D^{20} = +90°$ (c.=0.05, CHCl$_3$)

The biological properties of Lateriomycin F are as follows:

(1) Antimicrobial spectrum: Antimicrobial activities of Lateriomycin F against various microorganisms are shown in Table II.

Gram-positive or negative bacteria employed as the test microorganisms are incubated on bouillon agar at 37° C. for 24 hours. For acid-fast bacteria glycerin bouillon agar is used and incubated at 37° C. for 48 hours. In the case of employing fungi or yeast, glucose bouillon agar is used as assay medium and the incubation is carried out for 48 hours at 28° C.

Table II: Antimicrobial spectrum of Lateriomycin F

| Test microorganisms: | Minimum inhibitory concentration ($\mu$g./ml.) |
| --- | --- |
| Escherichia coli | 20 |
| Proteus vulgaris | 50–100 |
| Staphylococcus aureus | 0.5 |
| Bacillus subtilis | 0.1 |
| Bacillus cereus | 0.5 |
| Bacillus brevis | 0.2 |
| Sarcina lutea | 0.2–0.5 |
| Micrococcus flavus | 0.1 |
| Pseudomonas aeruginosa | >100 |
| Mycobacterium avium (strain resistant to streptomycin) | 5 |
| Mycobacterium smegmatis | 2 |
| Mycobacterium 607 | 5 |
| Mycobacterium phlei | 5 |
| Mycobacterium avium (strain resistant to neomycin) | 5 |
| Penicillium chrysogenum | >100 |
| Piricularia oryzae | >100 |
| Aspergillus niger | >100 |
| Saccharomyces cerevisiae | >100 |

As clearly seen in Table II, Lateriomycin F shows strong antimicrobial activities against Gram-positive bacteria.

(2) Acute toxicity: Fifty percent lethal doses (LD$_{50}$) of Lateriomycin F in mice, when observed for a week, are as follows:

about 600 $\mu$g./kg. intravenously,
about 310 $\mu$g./kg. intraperitoneally.

On comparison of the above-mentioned physico-chemical and biological properties of Lateriomycin F with those of the hitherto-known antibiotics, Lateriomycin F is shown to be a novel antibiotic. Concretely stated, from its ultraviolet and visible absorption spectrum shown on FIG. 1, Lateriomycin F is concluded to belong to the Rhodomycin group. The following antibiotics are hitherto-known ones of this group:

(1) "Rhodomycin A and B" described in "Chemische Berichte," volume 88, page 1792, published in 1955.
(2) "Rutilantin" described in "Biochemical Journal," volume 81, page 101, published in 1961, in "Tetrahedron Letters" (1959), No. 16, page 17; and in ibid. (1960) No. 8, page 25.
(3) "Cinerubin A and B" described in "Chemishe Berichte," volume 92, page 1867, published in 1959.
(4) "Pyrromycin" described in "Chemische Berichte," volume 92, pages 1880 and 1904, published in 1959.
(5) "Aklavin" described in "Journal of Bacteriology," volume 72, page 90, published in 1956, and in "Tetrahedron letters" (1960), No. 8, page 28.
(7) "Daunomycin" described in "Nature," volume 201, page 706, published in 1964: and in "Journal of the American Chemical Society," volume 86, page 5334, published in 1964.
(8) "Rubidomycin" described in the Japanese Patent Application, laid open to public inspection on May 7, 1965 under Publication Number of Sho 40–8800 (8800/1965); and in "Comptes rendus Hebdomadaires des Seances de l'Academie des Sciences," volume 257, page 1813, published in 1963.

However, Lateriomycin F is clearly different from the above-mentioned known antibiotics, for example, as elementary analysis, ultraviolet spectra, infrared spectra, antimicrobial spectra, toxicities, R$f$ values in thin layer chromatography, R$f$ values in paper partition chromatography and/or properties of aglycones. Therefore, it can be concluded that Lateriomycin F is a novel antibiotic.

The following experiments and examples set forth presently-preferred exemplary embodiments of the present invention; this is intended to be solely illustrative, however, and not at all limitative of the invention.

In the present specification as well as the following experiments and examples, the abbreviation "$\mu$g," "mg.," "g," "kg.," "ml.," "l." and "° C." refer to microgram(s), milligram(s), gram(s), kilogram(s), milliliter(s), liter(s) and degrees centigrade, respectively; percentages are weight/volume percentages unless otherwise described. And the following experiments and examples, the antimicrobial activity of a filtered broth is measured by cup method using Bacillus subtilis as a test organism and the antimicrobial activity of the antibiotic in mycelia is measured by the paper disk method with the use of the extracted solution from mycelia as the sample, the solution being prepared by subjecting the culture broth to centrifugation and extracting the resultant wet mycelia with acetone in the same amount as the liquid part separated by said centrifugation.

EXPERIMENT 1

50 ml. of Culture Medium (A) containing 5.0% of soluble starch, 2.0% of soybean flour, 0.5% of rice bran, 0.5% of casein hydrolyzate and 0.5% of sodium chloride and 50 ml. of Culture Medium (B) prepared by supplementing the said Culture Medium (A) with 0.05% of ferrous sulfate (FeSO$_4$), are respectively, inoculated with Streptomyces griseoruber No. 71070 (ATCC 17919), followed by incubation under shaking at 28° C. for 120 hours. The filtered broth and the extracted solution from the mycelia obtained in the Culture Medium (A) show antimicrobial activities of 70 $\mu$g./ml., 105 $\mu$g./ml., respectively. On the other hand, the filtered broth and the extracted solution from the mycelia obtained in the Culture Medium (B) show antimicrobial activities of 150 $\mu$g./ml., 700 $\mu$g./ml., respectively.

Streptomyces griseoruber No. 71070 (ATCC 17919) is incubated under shaking at 28° C. in culture media prepared by supplementing the Culture Medium (A) in Experiment 1 with 0.05% of ferric sulfate (Fe$_2$(SO$_4$)$_3$) and with various amounts of calcium chloride

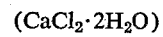

zinc chloride (ZnSO$_4$·7H$_2$O) and/or cupric sulfate

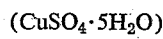

Antimicrobial activities of filtered broth and the extracted solution from the mycelia of each culture broth at 3 days, 5 days and 7 days after the start of the incubation are as shown in Table III:

trated at 40° C. in nitrogen atmosphere under reduced pressure. To the concentrate is added 40 ml. of diethyl

TABLE III

| Addition, percent | | | | Incubation period (day) | | | | | |
|---|---|---|---|---|---|---|---|---|---|
| | | | | 3 | | 5 | | 7 | |
| $Fe_2(SO_4)_3$ | $CaCl_2 \cdot 2H_2O$ | $ZnSO_4 \cdot 7H_2O$ | $CuSO_4 \cdot 5H_2O$ | Filtered broth [1] | Mycelia [2] | Filtered broth [1] | Mycelia [2] | Filtered broth [1] | Mycelia [2] |
| 0.05 | | | | 28.5 | 37 | 165 | 650 | 200 | 225 |
| 0.05 | 0.05 | 0.01 | 0.001 | 34 | 62 | 125 | 930 | 170 | 225 |
| 0.05 | 0.05 | | | 54 | 75 | 230 | 1,150 | 170 | 340 |
| 0.05 | | 0.01 | | 54 | 57 | 140 | 650 | 170 | 310 |
| 0.05 | 0.05 | 0.01 | | 37 | 52 | 175 | 380 | 155 | 195 |
| 0.05 | | | 0.001 | 31 | 40 | 115 | 750 | 115 | 265 |
| 0.05 | 0.05 | | 0.001 | 22 | 52 | 140 | 1,300 | 185 | 290 |
| 0.05 | | 0.01 | 0.001 | 26.5 | 57 | 150 | 930 | 185 | 245 |
| Control (Culture medium A) | | | | 41 | 21 | 65 | 45 | 52 | 28.5 |

[1] Antimicrobial activities of filtered broth (μg./ml.)
[2] Antimicrobial activities of extracted solution from mycelia (μg./ml.)

EXAMPLE 1

*Streptomyces griseoruber* No. 71070 (ATCC 17919) is inoculated on 30 liters of aqueous culture medium (pH 7.0) containing 5.0% of soluble starch, 3.0% of soybean flour, 1.0% of meat extract, 0.5% of sodium chloride and 0.05% of ferric chloride in a stainless steel fermenter, followed by incubation at 28° C. for 114 hours under aeration and agitation. The extracted solution from mycelia and the filtered broth of thus obtained culture broth show antimicrobial activities of 450 μg./ml. and 110 μg./ml., respectively.

The culture broth is filtered to give 6 kg. of wet mycelia. The mycelia are extracted with 12 liters of acetone by stirring and filtered off. The extract is concentrated under reduced pressure to about 3.3 liters. The concentrated solution is adjusted to pH 8.0 with a 10% aqueous solution of sodium hydroxide and extracted with 2.4 liters of ethyl acetate. The ethyl acetate layer is separated and washed with water, then dried, followed by concentration in nitrogen atmosphere under reduced pressure. To the resultant solution there is added 130 ml. of petroleum ether, then the mixture is kept standing a 4° C. for 3 hours to give precipitates. To the precipitates separated from the liquid part by decantation there is added 75 ml. of diethyl ether, and the mixture is kept standing at 4° C. for 4 hours. Then the precipitates are collected by filtration to obtain 1.2 g. of Lateriomycin F-containing product. The latter (1 g.) is dissolved in 250 ml. of acetone. After filtration, the filtrate is concentrated at 40° C. under reduced pressure to about 25 ml. Diethyl ether (100 ml.) is added to the solution and the mixture is kept standing at 0° C. for 4 hours to give precipitates. The precipitates are collected by filtration and dried to obtain 0.49 g. of Lateriomycin F as orange red powder.

EXAMPLE 2

*Streptomyces griseoruber* No. 71070 (ATCC 17919) is incubated in 30 liters of aqueous culture medium of the same composition as described in Example 1, followed by incubation at 28° C. for 90 hours under aeration and agitation.

10.3 kg. of wet mycelia separated from the culture broth are extracted with 20 liters of acetone by stirring and are then filtered off. The extract is concentrated under reduced pressure to 5 liters. The concentrated solution is adjusted to pH 8.0 with a 10% aqueous solution of sodium hydroxide, and then subjected to extraction twice with 2.5 liters each of ethyl acetate. After being washed with water and dried, the ethyl acetate layer is concentrated under reduced pressure. To the resultant residue there is added 180 ml. of diethyl ether, then the mixture is kept standing at 4° C. for 4 hours to give orange red precipitates. The precipitates are collected by filtration to obtain 650 mg. of Lateriomycin F-containing product. The latter (400 mg.) is dissolved in 60 ml. of ethyl acetate and then the mixture is filtered. The filtrate is concentrated at 40° C. in nitrogen atmosphere under reduced pressure. To the concentrate is added 40 ml. of diethyl ether. The mixture is kept standing at 0° C. for 4 hours to give precipitates. The precipitates are collected by filtration and dried to obtain 230 mg. of Lateriomycin F.

EXAMPLE 3

*Streptomyces griseoruber* No. 71070 (ATCC 17919) is inoculated in 500 ml. of aqueous culture medium containing 3.0% of soluble starch, 2.0% of soy bean flour, 1.0% of meat extract and 0.5% of sodium chloride, followed by incubation under shaking at 28° C. for 48 hours. The resulting culture broth is preincubated in 30 liters of aqueous culture medim of the same composition as described above under aeration and agitation. The preculture is incubated in 500 liters of aqueous culture medium of the same composition as above in a stainless steel fermenter at 28° C. for 96 hours under aeration and agitation.

Thus-obtained culture broth is treated after the manner described in Example 1 to obtain 257 mg. of Lateriomycin F.

When *Streptomyces griseoruber* No. 71070 (ATCC 17919) is incubated after the manner described above in an aqueous culture medium prepared by supplementing above-mentioned medium with 0.05% of ferric chloride and resultant culture broth is treated after the manner described in Example 1, 2.5 g. of Lateriomycin F is obtained.

EXAMPLE 4

This example exemplifies the usefulness of the novel product according to the present invention in vitro in combating pathogenic Gram-positive bacteria.

Due to the disclosed bactericidal and bacteriostatic properties of the new products of the invention, these are useful in vitro as antiseptics and disinfectants, e.g. to disinfect hospital apparatus, etc. which are generally exposed to pathogenic Gram-positive bacteria of the type which are sensitive to such products, as aforementioned.

Having thus disclosed the invention, what is claimed is:

1. An antibiotic consisting of Lateriomycin F, which has the following charateristics:
    (1) Elementary analysis (percent): C, 62.68±1.25; H, 6.34±0.50; N, 1.89±0.60;
    (2) Its specific rotation is $[\alpha]_D^{23} = +110 \pm 20°$ (c.=0.1, 1% DMF in 99% EtOH);
    (3) Its ultraviolet and visible absorption spectrum is as shown in FIG. 1 of the accompanying drawing, and the significant maximum absorptions observed are as follows:

$\lambda_{max.}^{Solvent*}$ 234 mμ
    252 mμ
    480 mμ
    498 mμ

*The solvent is 0.5% (v./v.) acetic acid in ethanol.

(4) Its infrared absorption spectrum is as shown on FIG. 2 of the accompanying drawing;
(5) It is positive to Molisch reaction and ferric chloride reagent, and it shows purple red color in concentrated sulfuric acid;
(6) It is soluble in methanol, ethanol, n-butanol, acetone, chloroform, dichloromethane, ethyl acetate, benzene, toluene, acetic acid, dimethylformamide, methyl Cellosolve, hardly soluble in diethylether and insoluble in water, petroleum ether, n-hexane and cyclohexane;
(7) Its molecular weight is 1020±220 by vapor pressure osmometer method in ethyl acetate.
(8) Its aglycone has the following characteristics:
  (a) Elementary analysis (percent): C, 63.31±0.3; H, 4.55±0.2; O, 32.13±0.3;
  (b) Melting point: 212–217° C.;
  (c) Its ultraviolet and visible absorption spectrum is as shown on FIG. 3 of the accompanying drawing;
  (d) Its infrared absorption spectrum is as shown on FIG. 4 of the accompanying drawing;
  (e) Specific rotation: $[\alpha]_D^{20} = +90°$ (c.=0.05, $CHCl_3$);
(9) It shows antimicrobial activities selectively against Gram-positive bacteria.

No references cited.

JEROME D. GOLDBERG, Primary Examiner

U.S. Cl. X.R.

195—80